United States Patent
Hurd et al.

(10) Patent No.: US 8,926,413 B2
(45) Date of Patent: Jan. 6, 2015

(54) AUTOMOTIVE HVAC ALTERNATIVE BLEED PATH FOR A VEHICLE WINDOW DEFROST

(75) Inventors: James Hurd, Canton, MI (US); John Kolodziej, Commerce, MI (US); Grant Holajter, Novi, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 1949 days.

(21) Appl. No.: 12/033,921

(22) Filed: Feb. 20, 2008

(65) Prior Publication Data

US 2009/0209194 A1  Aug. 20, 2009

(51) Int. Cl.
*B60S 1/54* (2006.01)
*B60H 1/00* (2006.01)

(52) U.S. Cl.
CPC .. *B60H 1/00064* (2013.01); *B60H 2001/00164* (2013.01); *B60H 2001/006* (2013.01)
USPC ........................................................ 454/127

(58) Field of Classification Search
USPC ........... 454/145, 69, 121, 127, 150, 262, 261, 454/143, 156, 159
See application file for complete search history.

(56) References Cited

U.S. PATENT DOCUMENTS

| | | | |
|---|---|---|---|
| 4,440,212 A * | 4/1984 | Tanino et al. | 165/204 |
| 4,852,798 A * | 8/1989 | Ito et al. | 237/2 A |
| 6,666,760 B2 | 12/2003 | Elliott et al. | |
| 6,852,024 B2 | 2/2005 | Seki | |
| 6,902,472 B2 | 6/2005 | Kuhlmann | |
| 7,232,367 B2 | 6/2007 | Butera et al. | |
| 2005/0020200 A1* | 1/2005 | Prosser et al. | 454/143 |
| 2005/0076668 A1* | 4/2005 | Choi | 62/404 |
| 2006/0208100 A1* | 9/2006 | Ellison et al. | 237/12.3 B |

FOREIGN PATENT DOCUMENTS

| | | |
|---|---|---|
| EP | 0989004 | 3/2000 |
| EP | 1092573 | 4/2001 |

* cited by examiner

*Primary Examiner* — Steven B McAllister
*Assistant Examiner* — Brittany Towns
(74) *Attorney, Agent, or Firm* — MacMillan, Sobanski & Todd, LLC

(57) ABSTRACT

A vehicle heating, ventilation and air conditioning system includes a plurality of ducts for providing conditioned air to an interior of a vehicle. The plurality of ducts includes a window defrost duct and a floor duct. The system includes a mixing chamber upstream of the window defrost and floor duct. A damper is selectively controllable to distribute the conditioned air to one or more of the plurality of ducts. The damper is configured so that when in a floor only mode position, the damper directs conditioned air in the mixing chamber only to the floor duct. A bypass conduit is configured to direct air from the floor duct to the window defrost duct when the damper is in the floor-only mode position. The conditioned air directed through the bypass conduit attenuates noise generated in the mixing chamber from emanating to the window defrost duct.

17 Claims, 3 Drawing Sheets

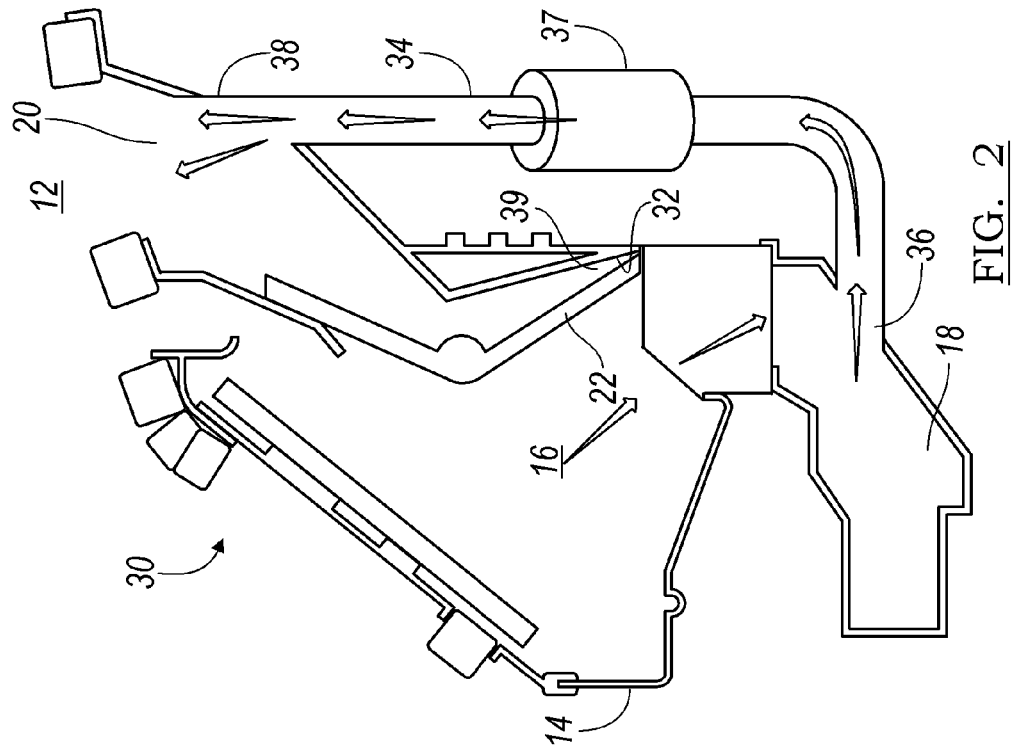
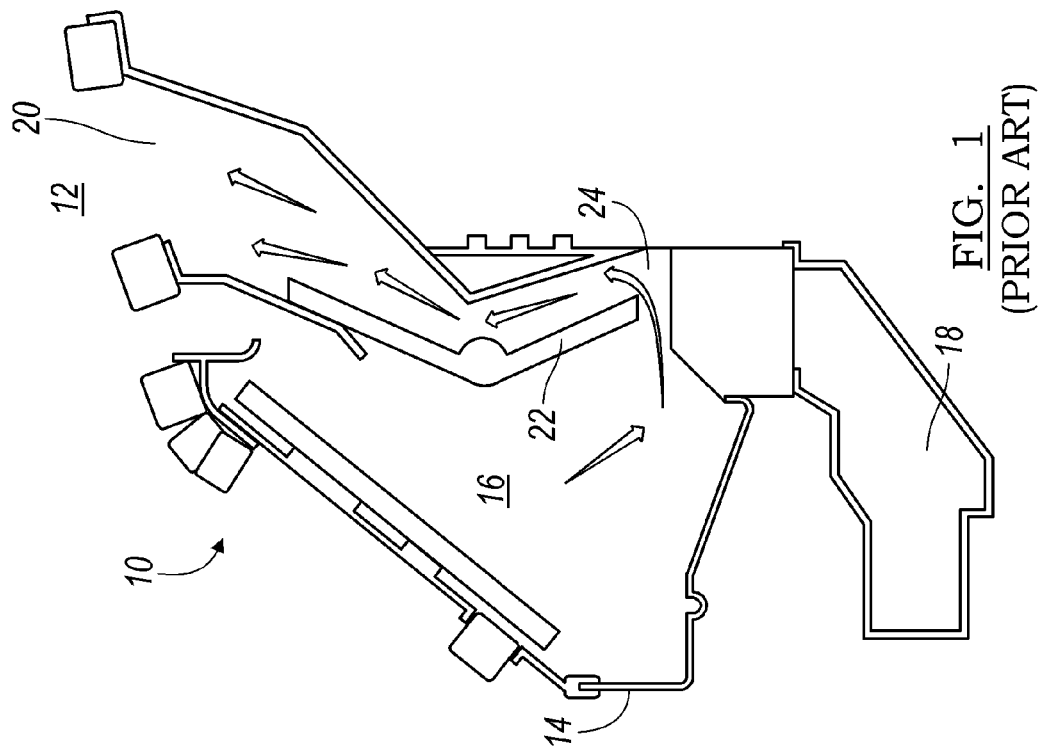

AUTOMOTIVE HVAC ALTERNATIVE BLEED PATH FOR A VEHICLE WINDOW DEFROST

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to vehicle HVAC systems, and in particular to window defrost systems.

2. Background of Related Art

Vehicles heating, ventilation, and air conditioning (HVAC) systems provide conditioned air to an interior compartment of a vehicle, and typically include a HVAC module assembly, which has a mixing chamber disposed therein. The mixing chamber combines heated air with cooled air which is output to various ducts and register vents of the vehicle. Examples of the various ducts include vehicle floor ducts, trim panel ducts, and window defrost ducts. A damper within the mixing chamber is positioned to direct the air to either the floor ducts, the trim ducts, the window defrost ducts, or a combination of the ducts depending on the selected mode of operation by a driver or passenger.

When operating the vehicle HVAC system in a floor-only mode position, the damper in the mixing chamber is left partially open to allow air to bleed from the mixing chamber directly to the window defrost duct. This maintains a low flow of conditioned air directed at the windows even though defrost is not selected; however, noise generated in the mixing chamber propagates from the highly turbulent mixing chamber directly to the window defrost duct where it can be heard by the driver and passengers of the vehicle. Such noise is not typically an issue when the window defrost mode is selected since the full thrust of forced air departing the window defrost duct masks the noise of the mixing chamber, but when floor-only mode is selected and the damper is left partially open, the result is unsatisfactory noise propagating through the opening to the window defrost duct and then to the passenger compartment.

BRIEF SUMMARY OF THE INVENTION

The present invention has the advantage of bleeding conditioned air to the window defrost duct when the damper is in a fully closed position. This reduces the propagation of noise from the mixing chamber to the window defrost duct. Consequently, vehicle passengers will not be exposed to this undesirable noise.

In one aspect of the present invention, a vehicle heating, ventilation and air conditioning system includes a plurality of ducts for providing conditioned air to an interior of a vehicle. The plurality of ducts includes a window defrost duct and a floor duct. The system includes a mixing chamber upstream of the window defrost and floor duct. A damper is selectively controllable to distribute the conditioned air to one or more of the plurality of ducts. The damper is configured so that when in a floor only mode position, the damper directs conditioned air in the mixing chamber only to the floor duct. A bypass conduit is configured to direct air from the floor duct to the window defrost duct when the damper is in the floor-only mode position. The conditioned air directed through the bypass conduit attenuates noise generated in the mixing chamber from emanating to the window defrost duct.

A method is provided for bleeding air to a window defrost duct of a vehicle when a damper that is selectively controllable to distribute conditioned air to one or more of a plurality of ducts is in a floor-only mode position. The method includes the steps of flowing air through a mixing chamber. A damper is actuated to direct all of the air flowing from the mixing chamber into a floor duct and blocking air flowing from the mixing chamber directly to window defrost duct. A portion of the air flowing in the floor duct is redirected into a bypass conduit. The portion of the air in the bypass conduit is directed into the window defrost duct downstream of an entrance of the window defrost duct leading from the mixing chamber.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a cross section view of a prior art HVAC assembly module.

FIG. 2 is a cross section view of a HVAC assembly module according to a first preferred embodiment of the present invention.

DETAILED DESCRIPTION OF THE PREFERRED EMBODIMENT

Figure 4:
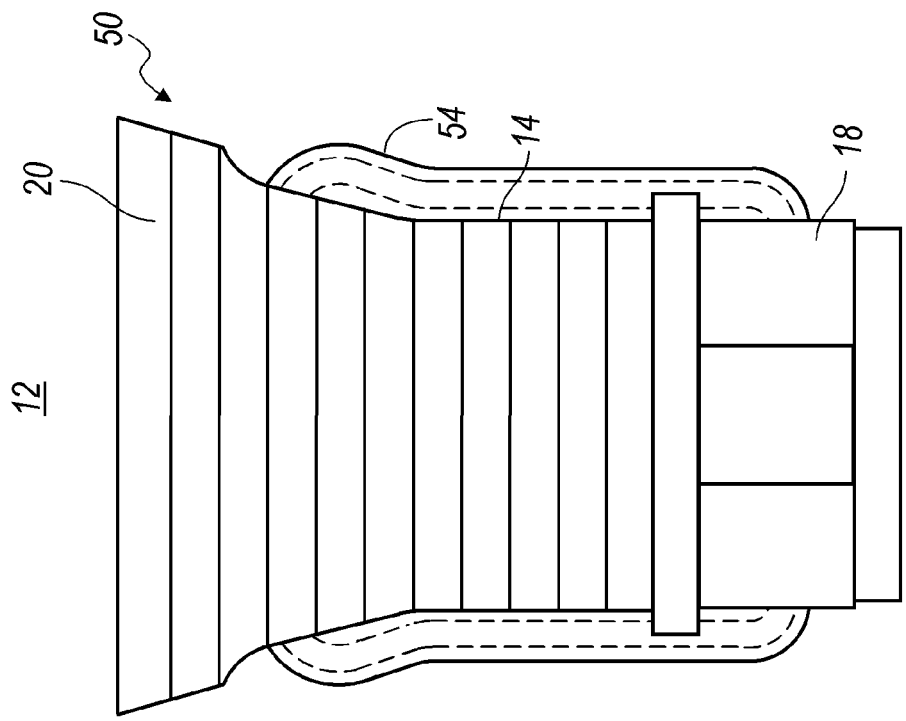
FIG. 4 is a front view of a HVAC assembly module according to a third preferred embodiment of the present invention.

Referring now to the drawings, there is illustrated in FIG. 1 a typical HVAC module assembly 10 for distributing conditioned air to the interior passenger compartment 12 of a vehicle. The HVAC module assembly 10 includes a HVAC module housing 14.

A HVAC mixing chamber 16 is disposed within the HVAC module housing 14 for mixing heated air within cooled air for distribution to various interior compartment ducts. Such ducts include a floor duct 18 and a window defrost duct 20.

A damper 22 is disposed within the mixing chamber 16 for selectively directing air to each floor duct 18, a trim panel duct (not shown), a window defrost duct 20, or a combination of both the floor duct 18 and the window defrost duct 20. When the damper 22 is in window defrost position, conditioned air is substantially prevented from entering the floor duct 18 and is directed to the window defrost duct 20. When the damper 22 is in the floor-only mode position, conditioned air is mostly prevented from entering the window defrost duct 20 and is directed to the floor duct 18.

As illustrated in FIG. 1, when the damper 22 is in the floor-only mode position, the damper 22 maintains a partial opening 24 between the mixing chamber 16 and the window defrost duct 20. The partial opening 24 allows a flow of conditioned air to bleed through the partial opening 24 to the window defrost duct 20 to act on the vehicle window. The mixing chamber 16 is an area where there is a highly turbulent to air flow. The high turbulence air flow propagating through the partial opening 24 generates unsatisfactory noise in the interior compartment 12 of the vehicle coming from the defrost duct 20.

Referring to FIG. 2, using like reference numbers to indicate corresponding parts, there is illustrated a HVAC module assembly 30 according to the preferred embodiment of the invention. The HVAC module assembly 30 includes a mixing chamber 16 for distributing conditioned air to the floor duct 18 and the window defrost duct 20. The damper 22 is pivotable to direct conditioned air to either the floor duct 18, the window defrost duct 20, a trim panel duct (not shown) or a combination of two or more ducts. When the damper is the floor-only mode position, the damper prevents conditioned air from flowing to the window defrost duct 20. Unlike the position of the damper illustrated FIG. 1, the damper 22, as illustrated in FIG. 2, when in the floor-only mode position substantially contacts the HVAC module housing inner wall 32 thereby eliminating the partial opening 24 shown in FIG. 1. As a result, turbulent air flow generated within the mixing chamber 16 is prevented from directly propagating from the mixing chamber 16 to the window defrost duct 20.

A bypass conduit 34 is configured to direct air from the floor duct 18 to the window defrost duct 20. The bypass conduit 34 is preferably separately formed from the HVAC module housing 14. A first end 36 of the bypass conduit 34 is coupled to the floor duct 18. A second end 38 of the bypass conduit 34 is coupled to the window defrost duct 20 downstream of an entrance 39 of the window defrost duct 20 leading from the mixing chamber 16. The entrance 39 is the opening between the mixing chamber 16 and the window defrost duct 20 when the damper 22 is in an open position.

The conditioned air within the floor duct 18 is less turbulent in comparison to the mixing chamber 16. As a result, the less turbulent conditioned air entering the bypass conduit 34 from the floor duct 18 minimizes the potential for noise to propagate to window defrost duct 20. Preferably, the bypass conduit 34 is coupled to the floor duct 18 in a high pressure region of the floor duct 18. Coupling the bypass conduit 34 to a high pressure region of the floor duct 20 ensures the flow of conditioned air is sufficient to propagate through the bypass conduit 34 to the window defrost duct 20.

Since a frequency response within the interior of different vehicles is not the same (i.e., some vehicles amplify noise more than other vehicles), the bypass conduit 34 may be design-specific to a respective vehicle line for attenuating those frequencies generated by the mixing chamber 16. For example the shape of the wall thickness of the bypass conduit 34 may be design-specific to a respective vehicle line for attenuating noise generated in the mixing chamber 16. In addition, the material composition of the bypass conduit 34 may be used to attenuate the unsatisfactory noise. For example, the bypass conduit 34 may be manufactured from a plastic (e.g., polypropylene); however, a rubber, synthetic material or other sound deadening material may be used.

In addition to the design variations of the bypass conduit 34 for attenuating noise generated in the mixing chamber 16, a noise attenuator 37 may operatively engage the bypass conduit 34 for attenuating noises that are progressing through the bypass conduit 34. Typically, broadband noise is generated in the mixing chamber 16. High frequency noise may be generated as a result of the conditioned air being forced through the opening of the bypass conduit 34 in the high pressure region of the floor duct 18. Therefore, the noise attenuator 37, such as a muffler or similar device, may operatively engage the bypass conduit for minimizing one or more of the noise frequencies propagating through the bypass conduit 34. The muffler may include a sound dampening material, a hollowed section, or similar feature that reduces or deadens the unsatisfactory noise within the bypass conduit 34.

Figure 3:
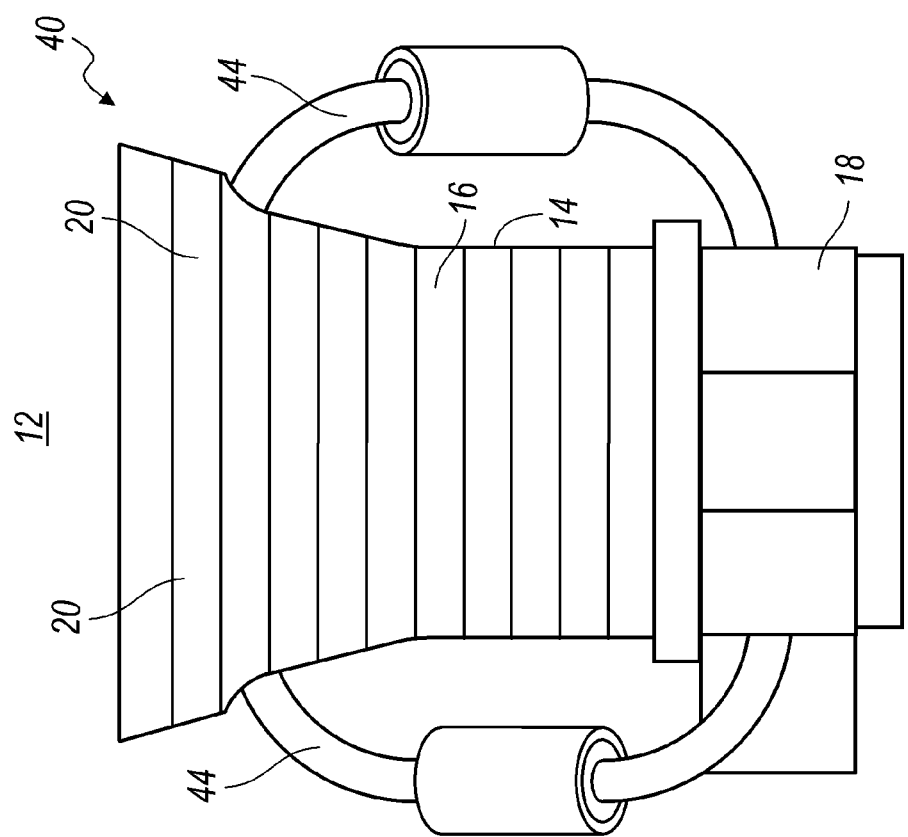
FIG. 3 is a front view of a HVAC assembly module according to a second preferred embodiment of the present invention.

FIG. 3 illustrates a second preferred embodiment of the present invention. The HVAC module assembly 40 as illustrated in FIG. 3 includes a plurality of bypass conduits 44. Since the vehicle may include more than one window defrost duct (e.g., driver's side window defrost duct and a passenger side window defrost duct) connecting to the mixing chamber 16 in the HVAC module housing 14, a respective bypass conduit 44 is used to couple the floor duct 18 to each of the respective window defrost ducts 20.

FIG. 4 illustrates a HVAC module assembly 50 according to a third preferred embodiment. The bypass conduit 54 is integrally formed as part of the HVAC module housing 14. The bypass conduit 54 is integrally formed to a wall of the HVAC module housing 14 during the molding process. This alternative design can be utilized when the packaging constraints are not an issue and when the bypass conduit 54 can be formed as part of the HVAC module housing 14. This bypass conduit 54 still directs air from the floor duct 18 to the window defrost duct 20.

Figure 5:
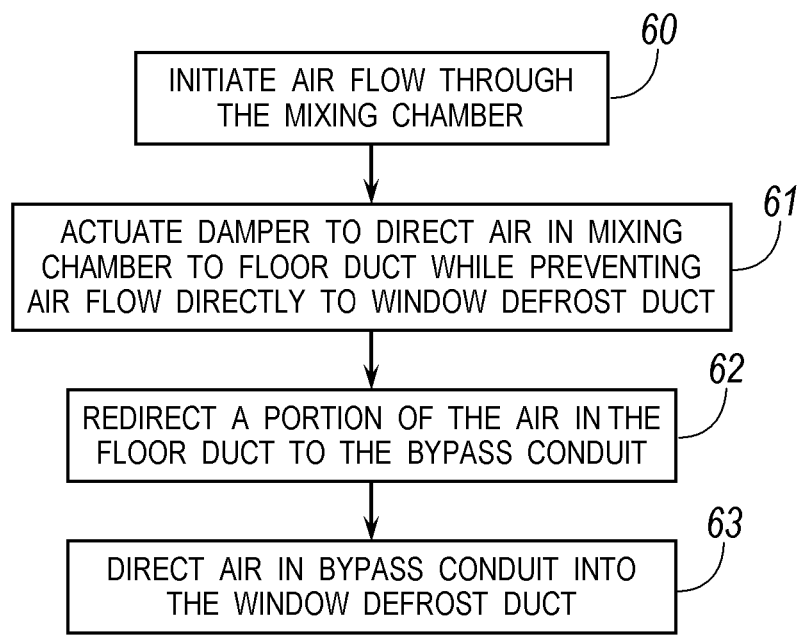
FIG. 5 is a method for bleeding conditioned air to window defrost duct according to the present invention

FIG. 5 illustrates a method for bleeding air to a window defrost duct of a vehicle when the damper to distribute the conditioned air to one or more of the plurality of ducts is in a floor-mode only position. In step 60, forced air is provided to a mixing chamber within the HVAC assembly module housing.

In step 61, a damper is actuated to direct all the air flowing from the mixing chamber to the floor duct. Air flowing directly from the mixing chamber directly to the window defrost chamber is blocked.

In step 62, a portion of the air flowing in the floor duct is redirected to the bypass conduit. Preferably, the attachment of the bypass conduit to floor duct attaches at a high pressure region of the floor duct so that conditioned air is forced through the bypass conduit.

In step 63, the conditioned air in the bypass conduit is directed into the window defrost duct at a position downstream of the entrance of the window defrost duct leading from the mixing chamber.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle heating, ventilation and air conditioning system comprising: a plurality of ducts for providing conditioned air to an interior of a vehicle, the plurality of ducts including a window defrost duct and a floor duct, a mixing chamber upstream of the window defrost and floor duct for mixing heated air with cooled air, the mixing chamber being a region of high turbulent air flow and the floor duct being a region of low turbulence air flow, respectively;

a unitary damper selectively controllable to distribute the conditioned air from the mixing chamber to one or more of the plurality of ducts, the damper configured so that when in a window defrost mode position, the damper directs conditioned air in the mixing chamber to the window defrost duct through an opening in the mixing chamber, the damper further configured so that when in a floor-only mode position, the damper directs conditioned air in the mixing chamber only to the floor duct and prevents conditioned air from entering the window defrost duct via the opening;

a bypass conduit connected to the floor duct and the window defrost duct, and configured to direct air from the floor duct to the window defrost duct when the damper is in the floor-only mode position, wherein the conditioned air directed through the bypass conduit exhibits attenuated noise with respect to noise in the mixing chamber as a result of the air being directed from the floor duct and a noise attenuator operatively engaging the bypass conduit for attenuating noise progressing through the bypass conduit.

2. The system of claim 1 wherein the noise attenuator includes a muffler.

3. The system of claim 2 wherein the muffler includes a sound dampening material for attenuating noise progressing through the bypass conduit.

4. The system of claim 2 wherein the muffler includes a hollowed section for attenuating noise progressing through the bypass conduit.

5. The system of claim 1 wherein a first end of the bypass conduit is coupled to the floor duct and a second end is coupled to the window defrost duct.

6. The system of claim 5 wherein the floor duct is a low turbulence region.

7. The system of claim 6 wherein the bypass conduit is coupled to a high pressure region of the floor duct.

8. The system of claim 5 wherein the mixing chamber is formed by a mixing chamber housing and the bypass conduit is integrally formed as part of the mixing chamber housing.

9. The system of claim 5 wherein the mixing chamber is formed within a mixing chamber housing and the bypass conduit is formed separately from the mixing chamber housing and is selectably attachable to the floor duct and the window defrost duct.

10. The system of claim 1 wherein a shape of the bypass conduit is formed to attenuate noise generated by the air flow emanating from the mixing chamber.

11. The system of claim 1 wherein a wall thickness of the bypass conduit is configured to attenuate noise generated by the air flow emanating from the mixing chamber.

12. The system of claim 1 wherein a material composition of the bypass conduit attenuates noise generated by the air flow emanating from the mixing chamber.

13. The system of claim 1 further comprising a second bypass conduit connected to the floor duct and the window defrost duct, and configured to direct air from the floor duct to a respective window defrost duct when the damper is in the floor-only mode position, wherein the conditioned air directed through the second bypass conduit exhibits attenuated noise with respect to noise in the mixing chamber.

14. A method for bleeding air to a window defrost duct of a vehicle when a unitary damper that is selectively controllable to distribute conditioned air to one or more of a plurality of ducts, the unitary damper configured so that when in a window defrost mode position, the damper directs conditioned air in a mixing chamber to the window defrost duct through an opening in the mixing chamber, the damper further configured so that when in a floor-only mode position, the unitary damper directs conditioned air in the mixing chamber only to a floor duct and prevents conditioned air from entering the window defrost duct via the opening, the method comprising the steps of:

flowing air into a mixing chamber, the mixing chamber being a region of high turbulence;

actuating the unitary damper into the floor-only mode to so that the unitary damper direct all of the air flowing from the mixing chamber into a floor duct and blocks air flowing from the mixing chamber directly to the window defrost duct via the opening;

while in the floor-only mode, redirecting a portion of the air flowing in the floor duct into a bypass conduit, the bypass conduit coupled to the floor duct and the window defrost duct, the floor duct being a low turbulence region relative to the mixing chamber; and while in the floor-only mode, directing the portion of the air in the bypass conduit into the window defrost duct downstream of the opening of the window defrost duct leading from the mixing chamber;

wherein the conditioned air directed through the bypass conduit exhibits attenuated noise with respect to noise in the mixing chamber as a result of the air being directed from the floor duct and step of redirecting the portion of the air includes redirecting the air through a noise attenuator in the bypass duct.

15. The method of claim 14 wherein the noise attenuator is tuned for a specific frequency of the audible noise generated in the mixing chamber.

16. The method of claim 14 wherein the noise attenuator attenuates high frequencies generated by the air flow transitioning from the floor duct to the bypass conduit.

17. The method of claim 14 wherein the noise attenuator attenuates broadband noise generated from the mixing chamber.

* * * * *